March 11, 1941.  C. E. LANG  2,234,264
CORE DRILL
Filed Nov. 21, 1938
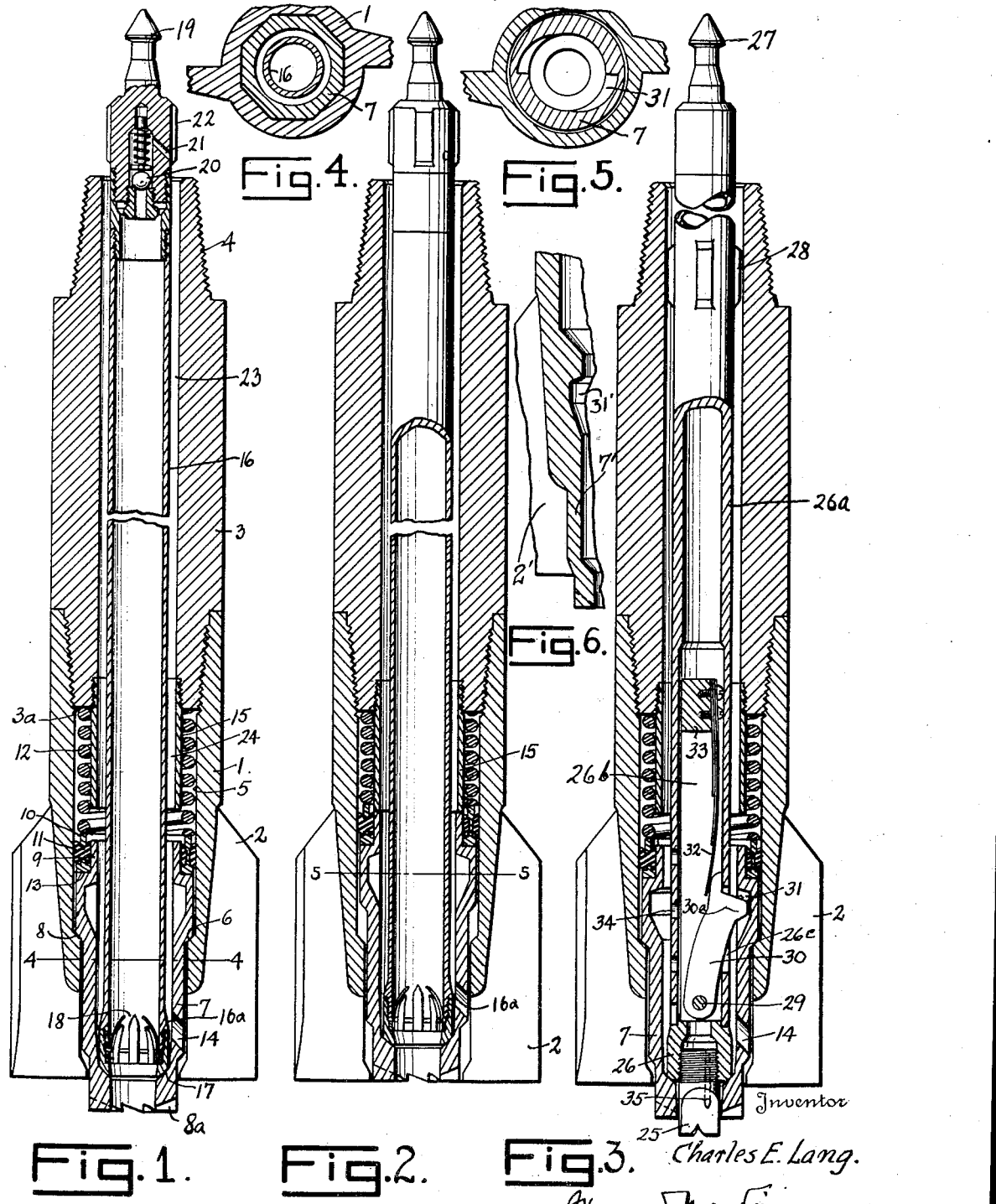
Inventor
Charles E. Lang.
By Vincent Martin
Ralph R. Browning
Attorney Patented Mar. 11, 1941

2,234,264

UNITED STATES PATENT OFFICE 2,234,264

CORE DRILL

Charles Eugene Lang, Houston, Tex.

Application November 21, 1938, Serial No. 241,509

13 Claims. (Cl. 255—72)

This invention relates generally to deep well drilling apparatus and specifically to core drilling apparatus of the type wherein the core barrel is movable downwardly in the drill stem into an operative position and upwardly through the drill stem after the core is taken, without removing the drill stem from the well.

The invention has for one of its general objects the provision of a core drill of this type, including a new and improved core cutter head operatively associated with the drill bit and adapted to receive the core barrel. In prior core barrels of this general type, the core cutter head is either mounted on the core barrel or is an immovable part of the drill bit. As the core barrel must pass through the drill stem, if the core cutter head is on the barrel, the external diameter of the core cutter head is limited by the internal diameter of the drill stem, and as the core must pass through the core cutter head, the internal diameter of the core cutter head is limited by the size of the core desired. If, on the other hand, the core cutter head is an immovable part of the drill bit, it cannot be made to extend substantially below the drill bit because it will be destroyed by hard formations. As the core cutter head in the present invention is movably associated with the bit and is not movable through the drill stem, it can be made larger and therefore stronger and more durable than can the prior core cutter head attached to the core barrel, and it is retractable into the bit to prevent destruction by hard formations.

The strength and durability of core cutter heads in bits of this type being of great importance, this advantage of the present invention will be readily understood by those skilled in the art.

A further object of the invention is to provide new and improved means to yieldably urge the core cutter head into the formation, and to positively limit the upward movement of the core cutter head in the drill bit when hard formations are encountered.

Prior drills of this general type usually include interengaging means between the core barrel and the drill stem and a spring associated with such means to yieldably urge the core barrel itself downwardly to hold the core cutter head on the bottom of the barrel in operative contact with the formation.

Another advantage of this invention consists in the provision of yieldable means interposed between the drill stem and the core cutter head to urge the core cutter head into operative contact with the formation, the core barrel being disposed to receive the core cut by the cutter head but not being connected to said cutter head or drill stem, whereby the core barrel is readily removable from the drill stem and the possibility of the core barrel becoming locked in the drill stem is thereby eliminated.

Another object of the invention is to provide a center cutting device and means whereby the same may be operatively connected to and removed from the core cutter head without removing the drill stem from the well, when it is desired to cut the entire bottom area of the hole. This advantage will be apparent to those skilled in the art as it is well known that drills of this type are both coring and drilling tools.

In prior core drills of this type, the interengaging means between the core barrel and the drill stem is usually disposed at the upper end of the core barrel. Therefore, the length of the core barrel cannot be varied without altering the position of those parts of the interengaging means on the drill stem, and this necessitates removal of the drill stem from the well and the provision of additional drill stem sections when a longer core is desired. An object of the present invention is to provide a drill of this general type having no interengaging means between the drill stem and the core barrel to the end that the core barrel may be made of any length without altering the drill stem and the parts associated therewith.

Prior drills of this type usually embody a large number of parts. The present invention has for a further object the provision of a new and improved drill of this type embodying but few parts that can be cheaply manufactured and are less apt to become broken or inoperative in use.

One of the specific objects of the invention is to provide a bit and core cutter assembly, the contacting surfaces of which are shielded by a packing to prevent the passage of slush therebetween and to keep the surfaces free from debris that might interfere with the relative movement thereof.

Another specific object is to provide in a bit of the type herein described means for directing the slush downwardly past the core barrel and upon the cutting blades of the bit, during coring operations and upon such blades and the center bit when the latter is employed in drilling operations.

Other objects will hereinafter appear.

The preferred embodiment of the invention is illustrated in the drawing, in which:

Fig. 1 is a sectional elevation of the drill with the core cutter head in its lowermost position and the core barrel in place;

Fig. 2 is a similar view with the core cutter head in its uppermost position;

Fig. 3 is a sectional elevation of the drill with the center cutting bit in place for drilling operations;

Fig. 4 is a horizontal section on the line 4—4 of Fig. 1;

Fig. 5 is a horizontal cross section through the core cutter head showing the latching recesses therein; and Fig. 6 is a fragmentary view showing a modification.

Referring first to Figs. 1 and 2 of the drawing which illustrate the use of a core barrel during coring operations, the numeral 1 indicates the drill bit which may be provided with oppositely disposed cutting blades 2. The drill bit 1 is connected with that part of the drill stem 3 known as the drill collar. The drill collar has a threaded shank 4 to which is connected the remainder of the drill stem, not shown.

The drill bit 1 has a central bore 5 and an internal annular shoulder 6. Vertically slidable in the bore 5 is the core cutter head 7 which has an external annular shoulder 8 to engage the shoulder 6 of the bit 1. The cutter head 7 may be provided on its lower end with annular teeth 8a to cut the core. The upper end of the cutter head 7 has a reduced extension 9 which forms with the bit 1 an annular chamber for the reception of a metallic ring 10 to which is moulded a rubber packer 11. Within the bit 1 is a compression spring 12 which bears upwardly against the lower end 3a of the drill collar 3 and downwardly upon the ring 10, its force being transmitted by the ring 10 to the shoulder 13 of the cutter head 7 whereby the annular cutting teeth 8a are yieldably urged into cutting contact with the formation. This spring is preferably so adjusted that in relatively soft formations the cutter head will be in its lowermost position indicated in Fig. 1 so that the core will be cut by the annular teeth 8a in advance of the blades 2 of the drill bit 1 and the core will not be contaminated by the slush pumped upon the blades 2 through the openings 14.

When a relatively hard formation is encountered which might destroy the lower portion of the cutter head 7, said cutter head 7 may move upwardly from the position shown in Fig. 1 to the position shown in Fig. 2 so that the lower end of the cutter head will be protected by the blades 2 of the drill bit. The spring 12 yields to permit such movement. Such upward movement is positively limited by the sleeve 15, with which the reduced extension 9 of the cutter head 7 comes in contact as shown by Fig. 2.

Within the drill stem 3 and cutter head 7 is the core barrel 16. The lower end of the core barrel rests upon an internal annular shoulder 17 in the lower portion of the cutter head 7 adjacent the cutting teeth 8a, and within the lower end of the core barrel 16 is a conventional core catcher 18. The core barrel is formed with an enlarged portion 16a adjacent its lower end, thus making it possible for the pressure between the core barrel and cutter head to assist in holding the core barrel down.

On the upper end of the core barrel 16 is a conventional spear head 19 adapted to be engaged by a conventional overshot (not shown) and in the upper end of the core barrel is a conventional air relief valve 20 to permit the escape from the core barrel 16 through the port 21 of air trapped above the core entering said barrel. The upper end of the core barrel 16 also has thereon circumferentially spaced ribs 22 which limit the lateral movement of the upper end of the core barrel without interfering with the downward movement of the slush between the core barrel and the drill stem.

The slush which is pumped downwardly in the drill stem for the purpose of removing the cuttings of the drill bit and core cutter teeth and keeping the same cool and also to prevent caving in of the walls of the well, passes downwardly in the space 23 between the drill stem 3 and core barrel 16, thence through the space 24 between the sleeve 15 and core barrel 16, thence between the cutter head 7 and core barrel 16 and finally outwardly through the ports 14 on the lower cutting portions of the blades 2 of the drill bit. The drawing discloses but one of the openings 14. It will be understood that the other opening is disposed on that side opposite from the side shown by the figures to the end that slush will be directed upon the lower portion of the advancing side of each blade. The ports 14 are of lesser area than the passageway around the core barrel, thus causing a differential of pressure between the space around the core barrel and the space outside the bit. This pressure differential acts upon the upper end of the enlargement 16a to hold the core barrel down and is prevented from taking full effect upon the lower portion of this enlargement by virtue of the seating of the core barrel within the cutter head. At the same time, mud or the like in the washing fluid will tend to settle in the wedge shaped space between the inner wall of the cutter head and the enlargement 16a, and this mud ring will assist in holding the barrel in place.

It will be noted that the sleeve 15 forms with the bit 1 a chamber for the reception of the upper portion of the spring 12 wherein said spring is shielded from the slush. It will also be noted that the space between the drill bit 1 and cutter head 7 is shielded by the packing ring 11 so that the slush cannot enter said space and by its abrasive action cut away the adjacent portion of the bit and cutter head, and so that no foreign matter can get therebetween and interfere with the free sliding movement thereof.

Fig. 4 illustrates the octagonal surfaces of the cutter head 7 and drill bit 1 whereby the cutter head 7 may move up and down in but is forced to rotate with the drill bit 1.

Referring now to Fig. 3 which discloses the use of a center cutting bit during drilling operations, the bit is indicated at 25 and is of a size to fit snugly within the lower portion of the cutter head 7. The center bit 25 is screwed into the lower end of a carrier 26 which is slidably carried within the lower end of the sleeve 26a. This sleeve 26a has on its upper end the conventional spear 27 and guiding ribs 28 corresponding with the spear 19 and ribs 22 of the core barrel shown by Figs. 1 and 2. The carrier 26 is slotted at 26b and pivotally mounted at 29 in the slot 26b is a latch 30 adapted to enter one of the slots 31 of the cutter head 7, into which slot the latch 30 is urged by the leaf spring 32 secured to a suitable support 33 mounted in the upper portion of the carrier 26. The sleeve 26a is slotted at 26c to receive the head 30a of the latch, and this head, when the latch has been mounted on the pin 29, prevents the sleeve 26a from being removed upwardly from the carrier.

The sleeve 26a is provided with a number of openings 34 so that slush may enter the lower portion thereof and pass outwardly through the slush passageways 35 in the center bit 25. One of said passageways 35 is shown in Fig. 3, the other (not shown) is on the other side of the center bit 25.

The operation of the drill is as follows:

The drill stem with the drill bit 1 attached to the lower end thereof and with the cutter head 7, spring 12, sleeve 15 and packing ring 11 in place being in the well, if the driller desires to obtain a core, he may either lower the core barrel into place by means of a conventional wire line (not shown) or drop it in the drill stem and permit it to descend to the position shown in Fig. 1. When the drill stem is rotated, the bit blades 2 and the core cutter blades 8a (the latter being driven by the bit 1 by reason of the octagonal surfaces illustrated in Fig. 4) will cut into the formation and a core will move upwardly into the core barrel 16 to be trapped therein by the core catcher 18, the air above the core in the core barrel 16 being permitted to escape from the core barrel 16 through the valve 20. As the drill stem is rotated, slush is pumped downwardly in the drill stem and emerges from the openings 14, as above explained.

The core cutter head 7 occupies the position shown by Fig. 1, or the position shown by Fig. 2, or intermediate positions, depending upon the hardness of the formation. The core barrel 16 is held in place by its own weight and by the pressure of the slush downwardly thereupon. After a core of the desired length has entered the core barrel 16 a conventional overshot (not shown) is lowered on the end of a cable into the drill stem and made to engage the spear head 19, and the core barrel is then pulled upwardly through the drill stem and the core removed therefrom, the drill stem 3, drill bit 1, core cutter head 7, spring 12 and associated parts remaining in place.

Now, when it is desired to drill rather than core, the center drilling device shown in Fig. 3 is similarly dropped or lowered into the drill stem and it will descend to the position shown by Fig. 3, the latch 30 swinging inwardly on its pivot 29 against the resistance of spring 32 when the latch encounters obstructions in the stem. When the carrier reaches its lowermost position shown by Fig. 3, the latch 30 enters one of the slots 31 to releasably hold the carrier 26 in said position, and to so connect the carrier 26 and the cutter head 7 that the carrier 26 and the center bit 25 carried thereby will be rotated with the cutter head 7 to cut the entire bottom area of the hole. During the rotation of the drill stem, the slush pumped downwardly therethrough passes through the openings 14 upon the blades 2 of the drill bit and through the openings 35 upon the blades of the center bit 25.

After the hole has been drilled to the desired depth, the overshot (not shown) is lowered into the drill stem and made to engage the spear head 27 and the sleeve 26a is thereby pulled upwardly. When the sleeve 26a is pulled upwardly, the lower end of the slot 26c strikes the latch 30 and moves the same inwardly to withdraw it from the slot 31 in the cutter head 7. Whereupon the carrier with its center bit 25 may be removed upwardly through the drill stem, the drill bit 2, cutter head 7 and associated parts remaining in the well.

Thus, the core barrel 16 and the center bit 25 may each be used in connection with the cutter head 7.

In Fig. 6 there is illustrated a slight modification which may be employed where it is undesirable or impractical to use a spring for holding down the core cutter head. In this form the core cutter head 7' is made integral with the bit 2'. It embodies the slots 31' which are similar in every respect to the slots 31. The operation is indentical with that already described except that, of course, the core cutter head has no spring action and cannot be moved with respect to the bit head.

Various advantages of the construction hereinabove described, other than the advantages hereinabove referred to, will be apparent to those skilled in the art.

I claim:

1. A drill including a drill stem; a drill bit connected to the lower end of said drill stem and having a central bore; a core cutter head movable upwardly and downwardly in said bore and having core cutting teeth on its lower end; and a core barrel in said cutter head to receive the core cut thereby; said core barrel being movable downwardly in said drill stem into said cutter head and being movable upwardly through said drill stem from said cutter head.

2. A drill including a drill stem; a drill bit connected to the lower end of said drill stem and having a central bore; a core cutter head movable upwardly and downwardly in said bore and having core cutting teeth on its lower end; means to yieldably urge said cutter head downwardly; and a core barrel in said cutter head to receive the core cut thereby; said core barrel being movable downwardly in said drill stem into said cutter head and being movable upwardly through said drill stem from said cutter head.

3. A drill including a drill stem; a drill bit connected to the lower end of said drill stem and having a central bore; a core cutter head associated for rotation with said drill bit and movable upwardly and downwardly in said bore and having core cutting teeth on its lower end; and a core barrel in said cutter head to receive the core cut thereby; said core barrel being movable downwardly in said drill stem into said cutter head and being movable upwardly through said drill stem from said cutter head.

4. A drill including a drill stem; a drill bit connected to the lower end of said drill stem and having a central bore; a core cutter head movable upwardly and downwardly in said bore and having core cutting teeth on its lower end; a packing ring to seal the space between said cutter head and said drill bit; and a core barrel in said cutter head to receive the core cut thereby; said core barrel being movable downwardly in said drill stem into said cutter head and being movable upwardly through said drill stem from said cutter head.

5. A drill including a drill stem; a drill bit connected to the lower end of said drill stem and having a central bore; a core cutter head movable upwardly and downwardly in said bore and having core cutting teeth on its lower end; and a core barrel in said cutter head to receive the core cut thereby and having a core catcher adjacent the lower end of said cutter head; said core barrel being movable downwardly in said drill stem into said cutter head and being movable upwardly through said drill stem from said cutter head.

6. A drill including a drill stem; a drill bit connected to the lower end of said drill stem and having a central bore; a core cutter head in said bore and having annular core cutting teeth on its lower end, said head being movable downwardly in said bit so that said teeth extend below said drill bit and movable upwardly so that said teeth are in substantially the same plane with the bottom of said bit; a spring to yieldably urge said cutter head downwardly in said bit; means to positively limit the upward movement of said cutter head; and a core barrel in said cutter head to receive the core cut thereby; said core barrel being movable downwardly in said drill stem into said cutter head and being movable upwardly through said drill stem from said cutter head.

7. A drill including a drill stem; a drill bit connected to the lower end of said stem and having a central bore; a core cutter head in said bore and having slush openings adjacent the lower end of said drill bit; and a core barrel in said cutter head to receive the core cut thereby, said barrel, when in said cutter head, forming therewith a slush passageway communicating with said openings, and said core barrel being removable from said cutter head upwardly through said drill stem.

8. A drill including a drill stem, a drill bit connected to the lower end of said drill stem and having a central bore, a core cutter head in said bore and having slush openings adjacent the lower end of said drill bit; a center bit in said cutter head; and a carrier for said center bit, said carrier having slush passageways to direct slush to said center bit and forming with said cutter head slush passageways communicating with said openings.

9. A drill including a drill stem; a drill bit connected to the lower end of said drill stem and having a central bore; a core cutter head in said bore and having core cutting teeth on its lower end, and provided with an annular, inwardly extending shoulder adjacent its lower end, said cutter head being adapted to be moved upwardly and downwardly with respect to the drill bit, a center bit in said cutter head, said center bit being movable downwardly in said drill stem into said cutter head and adapted to engage said annular shoulder when it is desired to drill a formation rather than core a formation; and being movable upwardly through said drill stem from said cutter head, when it is desired to core a formation rather than drill a formation.

10. A drill including a drill stem; a drill bit connected to the lower end of said drill stem and having a central bore; a core cutter head in said bore adapted to be moved upwardly and downwardly with respect to the drill bit and provided with an inwardly extending annular shoulder adjacent its lower end, and associated for rotation with said drill bit; and having core cutting teeth on said lower end; and a center bit in said cutter head and associated for rotation therewith, said center bit being movable downwardly in said drill stem into said cutter head when it is desired to drill a formation rather than core a formation and being movable upwardly through said drill stem from said cutter head and adapted to engage said annular shoulder when it is desired to core a formation rather than drill a formation.

11. A drill including a drill stem; a drill bit connected to the lower end of said stem and having a central bore; and a core cutter head in said bore; said cutter head having a longitudinally axially disposed chamber running throughout a portion of its length and extending to a zone substantially near the lower end of said core cutter head, and provided with an annular inwardly extending shoulder at said zone, said core cutter head having limited upward and downward movement relative to the drill bit and adapted to receive either a core barrel to trap the core entering said cutter head, or a center bit to cut the formation within the cutting element of the cutter head, said core barrel being removed from said drill stem when it is desired to drill a formation rather than core a formation and said center bit being removed from said drill stem when it is desired to core a formation rather than drill a formation.

12. A drill including a drill stem; a drill bit connected to the lower end of said stem and having a central bore; and a core cutter head projecting from the lower end of said drill bit, said cutter head having a longitudinal axially disposed chamber running throughout a portion of its length and extending to a zone substantially near the lower end of said core cutter head; and provided with an annular inwardly extending shoulder at said zone, said core cutter head having limited upward and downward movement relative to the drill bit and adapted to receive either a core barrel to trap the core entering said cutter head, or a center bit to cut the formation within the cutting elements of the cutter head; and center bit latching means in said head, said core barrel being removed from said drill stem when it is desired to drill a formation rather than core a formation and said center bit being removed from said drill stem when it is desired to core a formation rather than drill a formation.

13. A drill including a drill stem; a drill bit connected to the lower end of said drill stem and having a central bore; a core cutter head projecting from the lower end of said drill bit adapted to move upwardly and downwardly relative to the drill bit and having core cutting teeth on its lower end, and an annular internal extending shoulder adjacent its lower end; and a center bit in said cutter head, said center bit being movable downwardly in said drill stem into said cutter head and adapted to engage said annular shoulder, and being movable upwardly through said drill stem from said cutter head, said center bit and cutter head having cooperating latching means thereon whereby said center bit may be latched in said cutter head against upward movement and against rotative movement with respect to said cutter head, said core barrel being removed from said drill stem when it is desired to drill a formation rather than core a formation and said center bit being removed from said drill stem when it is desired to core a formation rather than drill a formation.

CHARLES EUGENE LANG.